United States Patent [19]

Becker

[11] Patent Number: 4,817,726
[45] Date of Patent: Apr. 4, 1989

[54] ACTUATING ARRANGEMENT FOR A POWER LIFT

[75] Inventor: Manfred Becker, Frankenthal, Fed. Rep. of Germany

[73] Assignee: Deere & Company, Moline, Ill.

[21] Appl. No.: 908,130

[22] Filed: Sep. 17, 1986

[30] Foreign Application Priority Data

Sep. 26, 1985 [DE] Fed. Rep. of Germany ....... 3534316

[51] Int. Cl.⁴ ............................................ A01B 63/112
[52] U.S. Cl. ...................................... 172/9; 200/61.54
[58] Field of Search ......................... 172/2, 3, 7, 9, 10, 172/11, 12; 200/81.4, 61.54; 361/245

[56] References Cited

U.S. PATENT DOCUMENTS

| | | | |
|---|---|---|---|
| 2,629,306 | 2/1953 | Rusconi | 172/2 |
| 2,674,332 | 4/1954 | Oushinsky | 172/3 |
| 3,455,397 | 7/1969 | Nelson et al. | 172/9 |
| 3,468,379 | 9/1969 | Rushing et al. | 172/2 |
| 4,508,014 | 4/1985 | Shoff | 200/81.4 X |
| 4,508,176 | 4/1985 | Wiegardt et al. | 200/61.54 X |

Primary Examiner—Richard T. Stouffer
Assistant Examiner—Sam Rimell

[57] ABSTRACT

A control system for the hitch of a tractor includes a motor for moving the mechanical control linkages connected to a hitch control valve, the motor being in the form of an electric motor. The motor is controlled by way of an electrical circuit which includes a main switch, one or more secondary switches which are disposed outside a driving cabin, and a safety switch. The safety switch permits flow of current to the motor only when positional regulation is selected by a hitch control mode selector lever.

7 Claims, 2 Drawing Sheets

ACTUATING ARRANGEMENT FOR A POWER LIFT

BACKGROUND OF THE INVENTION

The invention relates to a control system for a power lift, in particular for a power lift for the hitch of an agricultural tractor.

A known control system is described in John Deere 2140 tractor, Technical manual, TM-4373. Besides the control members and a selector lever for different regulating modes, this system includes a gate arrangement having a plurality of slots, one of which displaceably receives an operating lever which is connected to the control members. The operating lever is provided with a hande at the end which projects above the gate. The lever can be displaced by an operator located within the tractor cab. The operating lever acts by way of the control members on a shaft which operates a lifting and a lowering valve which controls a hydraulic cylinder which raises and lowers the hitch. Whether those links perform a lifting movement or a lowering movement, and the extent thereof, depends on the regulating mode determined by the position of the selector lever. If the selector lever is in a position for positional regulation, then the position of the control members and the operating lever precisely corresponds to the position of the links. If however, the selector lever is in a position for draft force regulation, then the position of the links corresponds to the force which acts on the hitch links. If the selector lever is in a position for hybrid regulation, then the position of the links is dependent on a mixture of the hitch position and the draft force. It would be desirable to be able to operate such a system from a position outside of the tractor cab.

SUMMARY OF THE INVENTION

The object of the present invention is to provide a way in which the hitch can be controlled from more than one location.

This and other objects are achieved by the present invention which includes an electric motor connected to the control linkage which operates a hitch control valve in a hitch control system. The motor is controlled by a main switch positioned in the tractor cab and by a one or more secondary switches which may be positioned in other locations. The main and secondary switches are connected in parallel. A safety switch is connected in series between the secondary switch and the motor and is operatively engageable with the hitch control selector lever so that the motion cannot be influenced by the secondary switch when the selector lever is in a draft force regulating position.

DETAILED DESCRIPTION

Figure 1:
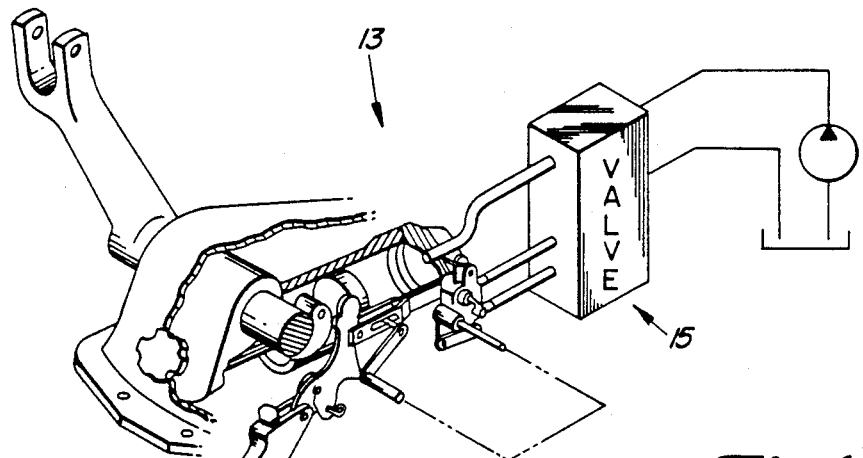
FIG. 1 is a perspective view of a control system according to the invention.
Figure 1:
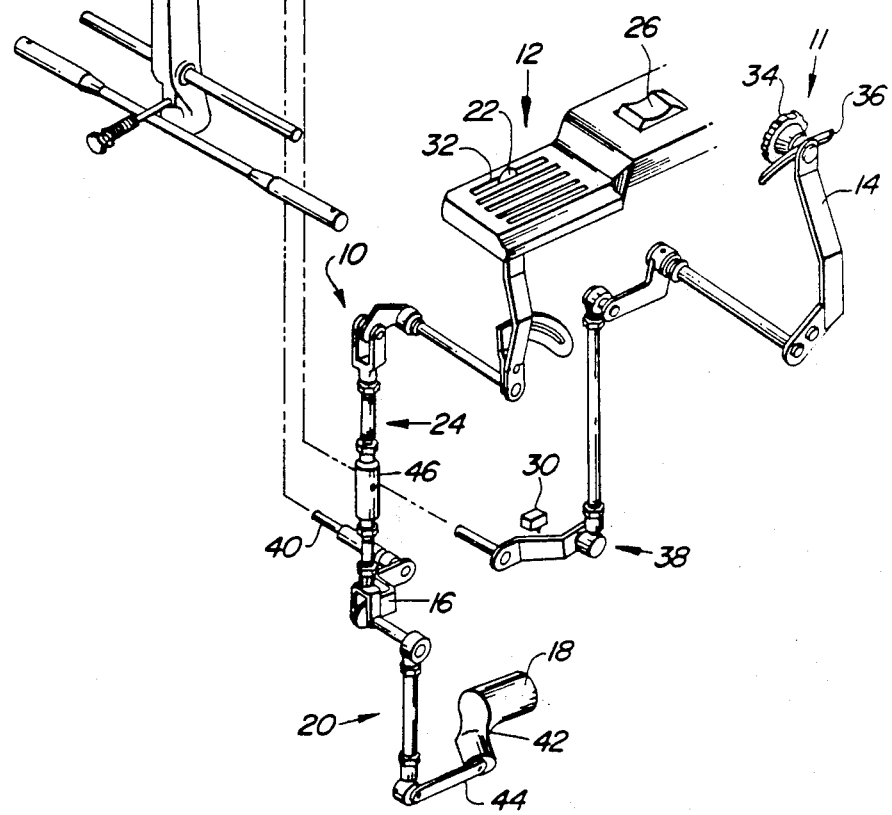

Referring to FIG. 1, shown therein is an actuating arrangement comprising an operating linkage 10 and a control unit 11 for a power lift 13 of an agricultural tractor, having links for connection to an implement which is to be mounted to the tractor. The control unit 11 includes a gate 12 and a selector lever 14 for selecting a regulating mode. The operating linkage 10 has a lever 16 for operating a conventional lifting and lowering valve 15. The arrangement also includes a motor 18 in the form of an electric motor, with a linkage 20 and an indicator 22 in the form of a pointer with control members 24. The arrangement further includes a main switch 26, at least one secondary switch 28 which is shown only in FIG. 2, and a safety switch 30, which are connected to each other and to the motor 18 in the manner shown in FIG. 2.

The gate 12 is provided with five slots 32, one of which receives the indicator 22 which is longitudinally movable therein. The indicator 22 extends through the slot 32 and projects above the surface of the gate 12. The indicator 22 is preferably in the form of a flat member, for example being made from flat steel with a pointed upper end. It may project above the gate 12, although this is not shown, to such an extent that an operating lever or a gripping sleeve can be fitted thereon so that not only does the indicator 22 serve to show the position of the lever 16, but the lever can also be moved by way of the indicator 22 itself. In that connection, however, it should be borne in mind that the lever 16 should be then separated from the motor 18 so that it does not suffer damage due to the movement of the operating lever. Also fitted into the gate 12 is the main switch 26 which is a rocker switch and which can be depressed into a "lower" position and into a "lift" position.

The selector lever 14 is provided with a fixing knob 34 and is held in a guide 36. The guide 36 permits pivotal movement of the selector lever 14 between a limit position for positional regulation and a limit position for draft resistance regulation. However, the selector lever 14 may also occupy any position between the two limit positions, in order to provide a mixed or hybrid regulation mode. The selector lever 14 acts indirectly on the lifting and lowering valve 15 by way of a lever mechanism 38 which co-operates with the safety switch 30.

The lever 16 is rigidly fitted at one end on a shaft 40 while at the other end it is pivotally connected to the linkage 20 and also to the control members 24. A pivotal movement of the lever 16 produces a rotary movement of the shaft 40, which operates valve 15 and results in a lifting or lowering movement of lower links of the power lift. The linkage 20 is pivotally connected at the other end to the motor 18 and thus transmits a control movement which originates from the motor, to the lever 16 and finally by way of the lever 16 to the lifting and lowering valve 15.

The motor 18 is preferably a low-speed motor with a transmission 42 which converts rotary movement into a pivoting movement which is transmitted to the linkage 20 by means of a lever arm 44 provided on the output side of the transmission. The motor 18 is therefore more or less comparable to a windscreen wiper motor and is also controlled in the manner shown in FIG. 2.

The linkage 20 may simply be in the form of a rod with ball end mounting members arranged at the ends thereof.

The control members 24, the individual portions of which will not be discussed in detail herein, have a screw threaded spindle 46 for varying the effective length thereof so as to permit adjustment of the relationship between the lever 16 and the indicator 22. The control members 24 are adapted to the respective requirements in regard to the transmission of forces and the circumstances in regard to available space, and may possibly also be of a different construction, for example in the form of a Bowden cable assembly. In the construction shown in FIG. 1, the function thereof lies primarily in transmitting the position of the lever 16 to the indicator 22.

Figure 2:
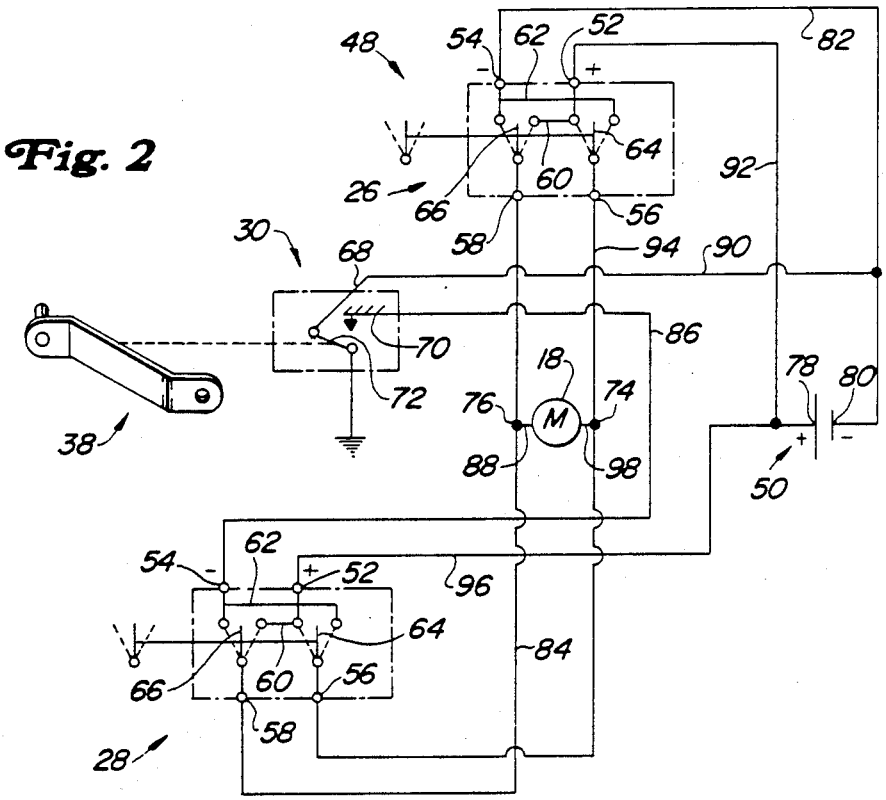
FIG. 2 is a view of a circuit diagram of an electrical circuit.

Referring now to FIG. 2, the electrical circuit 48 includes conventional battery such as 12 volt vehicle battery. The main, secondary and safety switches 26, 28 and 30, and also the motor 18, all have both positive and negative terminals. The main and secondary switches 26 and 28 are identical in construction and each have positive and negative inputs 52 and 54 as well as positive and negative outputs 56 and 58, the positive and negative inputs 52 and 54 being divided within the main and secondary switches 26 and 28 respectively, into two branches 60 and 62. The branches 60 and 62 and the positive and negative outputs 56 and 58 can be connected by way of contacts 64 and 66 which are movable from the exterior of the tractor and which are synchronously pivotable. The main and secondary switches are preferably biased to a non-conducting position.

The safety switch 30 is only provided with a negative input 68, a negative output 70 and a pivotal contact 72, wherein the latter, as already described hereinbefore, is actuated by the lever mechanism 38 in order for the negative input 68 to be connected to or dismantled from the negative output 70.

The motor 18 has positive and negative terminals 74 and 76 and the battery 50 has positive and negative poles 78 and 80.

A line 82 goes between the negative terminal 80 and the negative input 54 of the main switch 26. A line 84 goes between the negative output 58 of the main switch 26 and the negative output 58 of the secondary switch 28. A line 86 connects the negative input 54 of the secondary switch 28 with the negative output 70 of the safety switch 30. A line 88 connects the line 84 with the negative terminal 76 of the motor 18. Line 90 goes between the negative input 68 of the safety switch 30 and the line 82.

Similarly, for the purpose of connecting the positive terminals, a line 92 goes between the positive terminal 78 and the positive input 52 of the main switch 26, a line 94 goes between the positive outputs 56 of the main and secondary switches 26 and 28, a line 96 goes between the positive input 52 of the secondary switch 28 and the line 92, and a line 98 goes between the line 94 and the positive terminal 74 of the motor 18.

When the main switch 26 is pressed into a position for lifting movement, then the contact 66 connects the negative input 54 to the negative output 58 so that, via 82, 84 and 88, a connection is made between the negative terminal 80 of the battery and the negative terminal 76 of the motor 18 while the positive terminal 78 of the battery is connected to the positive terminal 74 of the motor 18 by way of the lines 92, 94 and 98.

When the main switch 26 is pressed in the direction for lowering, then the contact 66 connects the negative input 54 to the positive output 56 and the contact 64 connects the positive input 52 to the negative output 58 so that pole reversal occurs at the motor 18 and the lever arm 48 is pivoted in the other direction.

If the motor 18 is to be operated from the secondary switch 28, then for lifting purposes the positive output 56 is connected to the positive input 52 of the secondary switch 28 by way of the contact 64 so that current flowing from the positive terminal 78 of the battery passes through the lines 96 and 98 to the positive terminal 74 of the motor 18 while the negative terminal 80 of the battery is connected to the negative terminal 76 of the motor 18 by way of the lines 90, 86, 84 and 88 by virtue of the connection of the negative input 54 to the negative output 70 of the safety switch 30 by means of pivot contact 72.

When the secondary switch 28 is pressed in the lowering direction, then pole reversal also occurs in the secondary switch 28 and at the motor 18, in the manner described above with reference to the main switch 26, so that the lever arm 44 of the motor 18 again pivots in the opposite direction.

Control by means of the secondary switch 28 is only possible when the safety switch 30 permits a flow of current from the negative terminal 80 of the battery to the negative input 54 of the secondary switch 28.

The electrical circuit 48 may be modified to include a monostable multivibrator coupled to the secondary switch 28 so that the lower links are lifted only for a limited period of time, and thus only over a limited range. This prevents undesired and excessive movement of the lower links if the secondary switch 28 is depressed for an unintentionally long period of time. It is also possible for an astable multivibrator to be connected to the secondary switch 28 so that the lower links are lifted stepwise by way of pulses which are emitted by the astable multivibrator, as long as the secondary switch or switches 28 is or are depressed, movement of the lower links being immediately interrupted if the secondary switch 28 is released.

Such multivibrators could also be connected to the main switch 26.

The connection of the main switch 26 to the secondary switch 28 may be by way of transistors and/or diodes which are connected relative to each other in such a way that actuation of the main switch 26 enjoys priority over actuation by the secondary switch 28. When the arrangement includes a plurality of secondary switches 28, they may also be connected together by way of a relay in order to ensure that short-circuiting does not occur when a plurality of secondary switches 28 are actuated simultaneously.

In addition thereto, a device (also not shown) for varying the output speed of the motor 18 may also be connected on the input side thereof so that it is possible to choose between a high and a low motor output speed.

When using an astable multivibrator, the duty cycle can be adjusted according to the inertia of the power lift, its regulating time and the like. In all it would be possible to envisage a main switch 26 and a secondary switch 28 which could each have five different positions, namely a neutral position, a position for a low speed lifting when using a monostable multivibrator characteristic, a position for a high speed lifting when using a monostable multivibrator characteristic, a position for a low speed lowering when using an astable multivibrator and a position for a high speed lowering when using an astable multivibrator.

Figure 3:
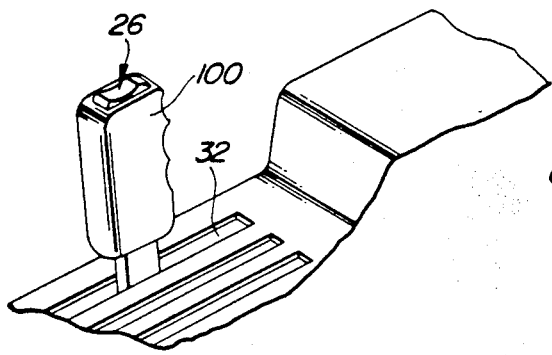
FIG. 3 is an alternative embodiment of the invention shown in FIG. 1.

FIG. 3 shows the gate 12 with a plurality of slots 32. An operating lever 100 extends upwardly from one of the slots 32 and is connected to the lever 16 by way of the above-mentioned control members 24. The upper end of the operating lever is provided with the main switch 26 instead of the switch being fitted into the gate 12 as in the FIG. 1 construction. The operating lever 100 also takes the place of the indicator 22 as by virtue of its position in the slot 32, it shows the respective position of the lower links. The lever 16 and the control members 24 can be selectively connected to the motor 18 by way of a releasable connecting member (not shown), for example a clip or a clamp member, so that the operating lever 100 can be used for actuating the operating linkage 10 if the motor 18 or the entire electrical circuit 48 should have a defect. In that case however a connection between the operating lever 100 and the lever 16 must always be maintained so that the operating lever 100 can show the position of the lower links, in the slot 32. If the main switch 26 is integrated into the operating lever 100, then it would be appropriate for the operating lever 100 not to be formed from a solid material but from a hollow material so that the connections to the main switch 26 can be taken to the main switch 26 within the operating lever 100.

I claim:

1. A tractor hitch control system comprising:
   a manually operable control member;
   an hydraulic actuator means operable to raise and lower the hitch;
   a linkage forming a purely mechanical connection between the control member and the actuator means for transmitting control signals from the control member to the actuating means;
   an electric motor selectively operated by one of the control member and linkage; and
   a manually operable switch means coupled to the motor, the switch means being operable to activate the motor to move the one of the control member and linkage to thereby operate the actuator means, the switch means comprising a main switch and at least one secondary switch positioned remote from the main switch.

2. The hitch control system of claim 1 further comprising:
   a regulating device for selecting and combining positional and draft force responsive control of the hitch; and
   a safety switch operatively engageable with the regulating device and connected to the motor to interrupt current flow to the motor when the regulating device selects draft force responsive control of the hitch.

3. The hitch control system of claim 2, wherein:
   the safety switch is connected between the secondary switch and the motor.

4. The hitch control system of claim 2, wherein:
   the safety switch is a two-position switch having a conducting position and a non-conducting position.

5. The hitch control system of claim 1, further comprising:
   a gate having an elongated aperture therein; and
   an indicator connected to the linkage and movable in the gate aperture to indicate the position of the linkage thereby indicating the position of the hitch.

6. The hitch control system of claim 1, wherein:
   the main and secondary switches are connected in parallel with respect to each other.

7. The hitch control system of claim 1 wherein:
   the control member is displaceable by way of manually operable lever; and
   the main switch is disposed on the lever.

* * * * *